Aug. 25, 1970   W. J. HEINECKE ET AL   3,525,978
DIRECTIONAL SEISMIC SENSING SYSTEM
Filed Nov. 13, 1967                                 2 Sheets-Sheet 1
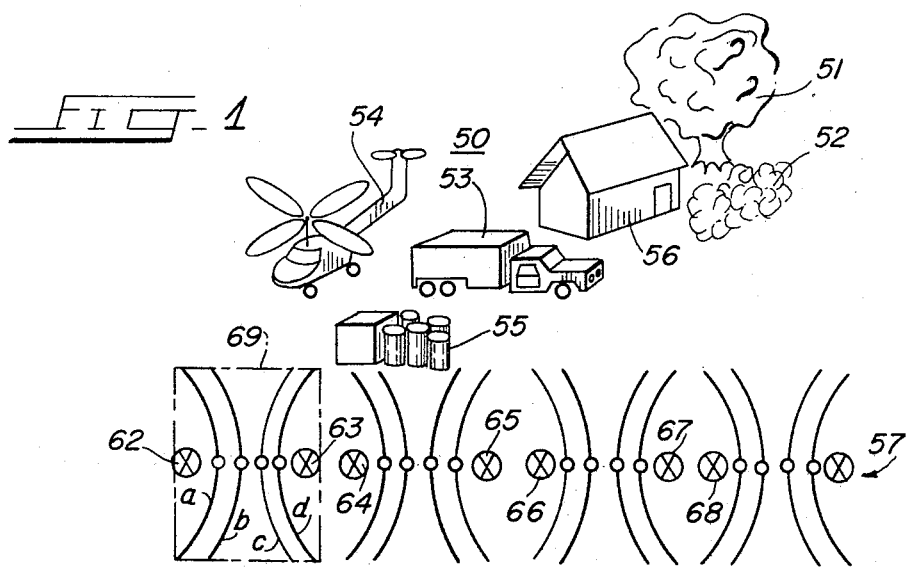
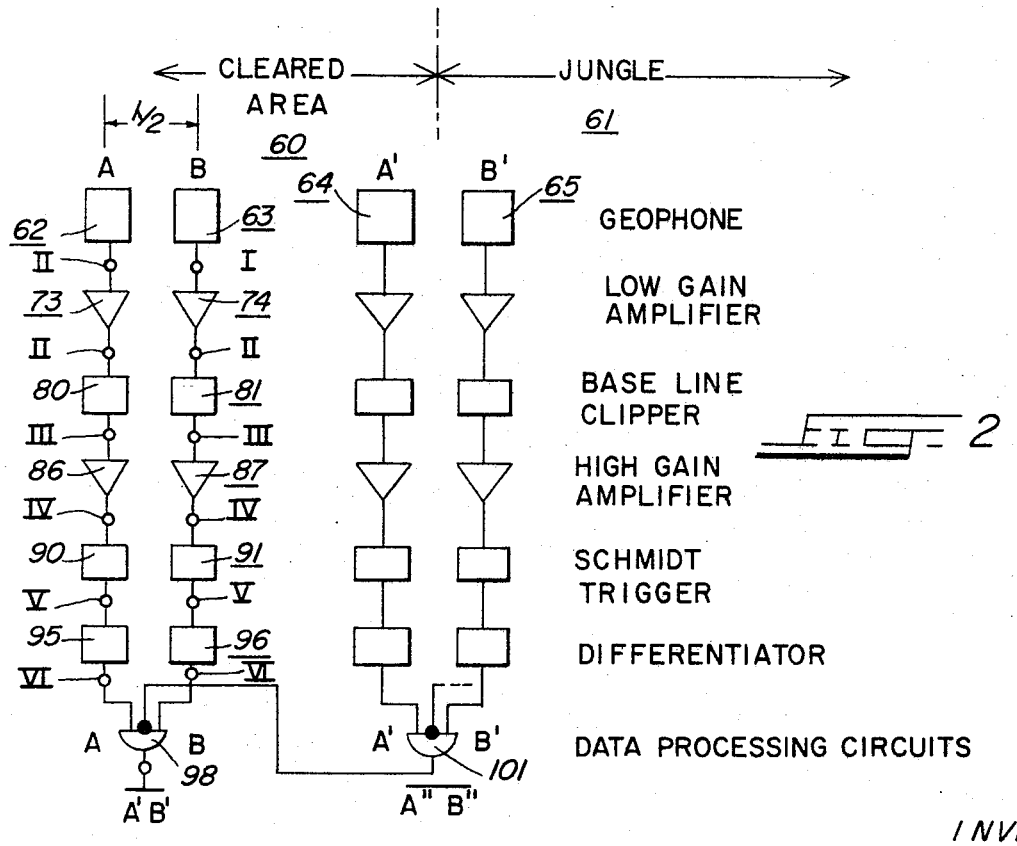
INVENTORS.
WILLIAM J. HEINECKE
GUNARS GRABIS
BY Louis Bernat

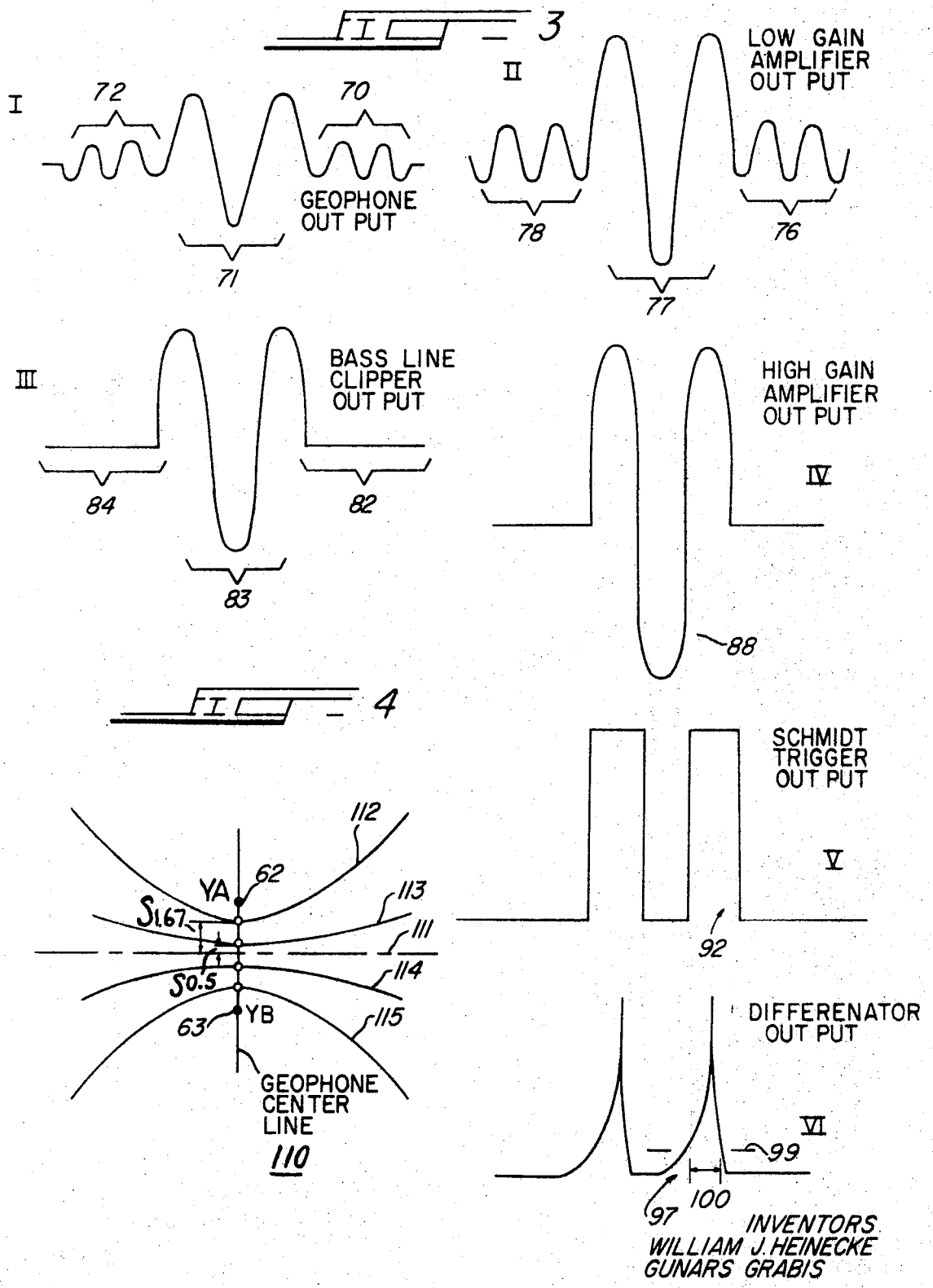

United States Patent Office 3,525,978
Patented Aug. 25, 1970

1

3,525,978
DIRECTIONAL SEISMIC SENSING SYSTEM
William J. Heinecke, Sudbury, and Gunars Grabis,
Arlington, Mass., assignors to Sensor Precision Industries, Inc.
Filed Nov. 13, 1967, Ser. No. 682,182
Int. Cl. G01s 3/00
U.S. Cl. 340—16
2 Claims

ABSTRACT OF THE DISCLOSURE

Geophones are placed a half-wave length apart along a base line, the wave length being an earth motion which is characteristic of the predetermined source of motion in a monitored area. When earth motion occurs at this selected wave length, the geophones experience the motion at about the same time. Thus, by detecting the signals of the adjacent geophones within a fixed time period, it is possible to select those sources which produce earth motion of the selected wave length. The signals from the geophone are converted into digital signals so that data processing equipment may analyze them to logically interpret the probable source of the detected motion.

---

This invention relates to seismic sensing systems for protecting selected areas on the surface of the earth, and more particularly to systems for detecting earth movements within a predetermined area of acceptance while rejecting movements which are outside the area.

Systems of the described type generally use geophones coupled to the earth surface to vibrate therewith. The geophones are scattered around a protected area to give output signals which are used to sound alarms or perform other control functions when invaders approach the area. Unfortunately, however, geophones have circular response patterns. Therefore, they give equal signals responsive to equivalent earth movements in any direction. Thus, it follows that, geophone controlled systems have generally failed to distinguish between intruders who are entering and others who are legally in the area.

Accordingly, an object of the invention is to provide new and improved systems for detecting seismic disturbances. A further object is to provide directional, seismic disturbance, detection systems by using readily available geophones having circular response characteristics. Yet another object is to provide seismic systems which have an enhanced ability to discriminate between earth vibrations caused by intruders and other vibrations caused by general background noise.

A further object is to reduce the sensitivity of the system to almost all except the disturbances caused by target sources of earth vibrations.

In keeping with an aspect of the invention, these and other objects are accomplished by means of geophones used in phased pairs around the periphery of a guarded area. The geophones in each pair are placed a predetermined distance from each other. Each geophone is coupled to feed its output signal into an individual associated channel of data processing equipment. If the signals in the channels of two adjacent geophones coincide within a predetermined time period, an alarm is given. The area of acceptance may be varied by changing the predetermined time period and by changing the gain of the data processing channel.

The nature of an exemplary system designed to accomplish the above and other objects may become more apparent from a study of the attached drawings, in which:

FIG. 1 is a symbolic representation of a guarded area containing a number of sources of background noise;

FIG. 2 is a block diagram showing four geophones and their individually associated channels of data processing equipment;

FIG. 3 is a series of voltage wave forms marked I–IV which illustrate the signals appearing at similarily marked points in FIG. 2; and FIG. 4 is a drawing which shows how the area of acceptance may be varied for any phased pair of geophones.

FIG. 1 has been drawn to illustrate the problems inherent in systems of the described type. Briefly, a general camp area 50 includes a number of natural sources of earth movement, such as the roots of trees and bushes 51, 52. Other sources include man made devices, two of which are shown at 53, 54. Finally, the drawing shows a number of passive objects 55, 56 which do not normally cause earth movements, but which may cause activity that contributes to background noise.

The general area 50 is surrounded by a perimeter 57 which must be guarded to prevent an infiltration by intruders. To illustrate the wide range of problems which may occur, the drawing shows that the perimeter area through which the intruder must pass may range from a completely cleared area 60 to a dense jungle 61.

In greater detail, the perimeter 57 centers on a base line having a number of geophones 62–68 placed thereon. Any intruders who approach the base line must cause some earth movement. The geophones respond to such movement by generating suitable electrical signals. The basic problem has been that it was very difficult to provide a selectivity adequate to sort out the various sources of noise. For example, the roots of trees and bushes 51, 52 cause an almost constant noise over the entire general area. The motors or wheels of vehicles 53, 54 cause occasional noise. The presence of the house and supplies 56, 55 indicate a general level of human activity in the camp area, and that activity causes noise. All of these and similar sources cause an almost constant roar of background seismic movements which often have amplitudes in excess of the amplitude of movement caused by intruders stealthily moving through the jungle 61. Thus, the problem is primarily one of selecting the sought after signal while rejecting all others.

According to an aspect of the invention, the selectivity of the system is vastly improved by using geophones in phased pairs. Preferably, the geophones of a pair are separated by a distance approximately equal to one-half a wave length of the earth motion characteristic of the monitored source. A number of these phased pairs of geophones are then placed along the base line for monitoring the earth motion occurring in a strip centered on the base line. By a proper design and placement of the geophones and by electronic processing of signals picked up by the geophones, the detection system may be given a predetermined area of acceptance. For example, one pair of geophones 62, 63 detects the earth movement in field 69, and rejects all other. As will become more apparent from the description of FIG. 4, the lines a–d indicate how the area of acceptance may be made larger or smaller by varying the time period during which the signals detected by the geophones 62, 63 must coincide.

While any suitable type of geophone may be used, a preferred embodiment of the invention incorporates Hall-Sears subminiature geophones.

Reference may be had to FIG. 2 for a disclosure of how the geophone signals may be processed. This figure shows four separate geophones, each having an individually associated channel of data processing equipment. Each channel includes a cascade of circuits which are: a low gain amplifier, a base line clipper, a high gain amplifier, a Schmidt trigger, and a differentiator, all identified by the labels near the right-hand edge of the drawing.

Briefly, the geophone picks up an analog wave form (FIG. 3, I) which is amplified to improve the signal-to-noise ratio (II). Then the background noise is removed by clipping III. The signal which remains is amplified to reduce certain phase angle problems IV, and then converted into a digital form (V). The digital signals generate a time related wave form (VI) which establishes the time period during which the signals from adjacent geophones must coincide if they are to be detected.

In greater detail, the geophones are always operated in phased pairs (e.g. A, B and A', B' are two such pairs). For purposes of description the pair A, B are construed to be those also shown at 62, 63 in FIG. 1; however, the letters A, B are used so that the description will be a general one. The notation λ/2 indicates that these geophones are separated by a half a wave length.

The background noise is picked up as a fairly steady state signal, as shown at 70, 72. A new and intruding source of earth movement causes a signal 71 (herein called the "pertinent signal") to be superimposed upon the background noise. Hence, the amplitudes will add, and the new signal will almost certainly have an amplitude that is higher than the amplitude of the background noise. If the new earth movement has a wave length of λ, the two geophones A, B will produce high amplitude signals at about the same time. Therefore, each geophone sends a pertinent signal down its individually associated channel of equipment at about the same time. Thus, signals will emerge from the two channels at about the same time, and detection occurs.

In each channel, the output of the geophone A, B is coupled to a low gain amplifier 73, 74 which improves the signal-to-noise ratio. For example, the signal-to-noise ratio of the picked up signal may be three-to-one (wave form I). The absolute difference is then two volts on some voltage scale. If both noise 76, 78 and signal 77 are amplified in some amount (say 3×) the ratio changes to 9×−3×. In terms of absolute values, the difference is now 6×. Thus, it is much easier to separate the signal from the noise.

Each low gain amplifier 73, 74 is coupled to a base line clipper 80, 81 which is a device that will produce an output signal only when its input signal exceeds a given level. For example, under the above assumptions, the base line clipper will not produce an output signal responsive to a 3×-volt noise level 82, 84 but will produce a signal 83 responsive to a 9×-volt signal level. Therefore, the output of the base line clipper contains the pertinent signal, but none of the background noise.

The output of each base line clipper 80, 81 is coupled to drive a high gain amplifier 86, 87. The output signal 88 of this amplifier has very fast rising wave forms which have almost vertical sides, for all practical purposes. Hence, there is a very small room for any phase angle differences.

Means are provided for converting the analog signal into digital signals. More particularly, the high gain amplifiers 86, 87 drive Schmidt trigger 90, 91 which produce square wave output signals 92. In view of the steep rising wave forms of signal 88, there are no appreciable variations resulting from any phase angle differences. Thus, it should be apparent that the analog signal 71 representing earth motion has been converted into the digital signals 92.

Means are provided for measuring a time period (here called the "acceptance aperture") during which the pertinent signals much emerge from two adjacent data processing channels if detection is to occur. More specifically, the digital signals 92 are applied to the differentiator circuits 95, 96 which generate a pulse having a form shown at VI. The width of this pulse will be determined by timing circuits in the differentiator—which may be any suitable well known RC circuit, for example. Thus, if the logic circuit 98 conducts responsive to voltages exceeding the level 99, a coincidence is possible during the time 100 while the voltage of the signal 97 exceeds that level. Hence, the duration of the acceptance aperture 100 may be increased or decreased by changing the delay time of the pulses 97.

In operation, the geophones 62, 63 experience the same earth motion, but they experience it at slightly different times depending upon the seismic velocity and the space between the geophones. As it experiences such motion each geophone injects an analog signal representative of the motion into its individually associated data processing channel. When the earth motion has a wave length approximately equal to λ, the adjacent geophones will inject the pertinent signals into their associated channels at about the same time. Thus, the pertinent signals will travel down the channels in an approximate synchronism. If both of the inputs A, B are energized during the acceptance aperture 100, the AND gate 98 conducts to indicate the probable detection of an intruder.

Means are provided for rejecting signals resulting from general background noise. In greater detail, if a person walks through the guarded area where the earth motion is localized, only a few geophones detect it. On the other hand, if there is a bomb burst, for example, the resulting earth motion is picked-up by many geophones, such as 62–65. As seen in FIG. 2, all of the output terminals A, B, A', B' receive an output signal at about the same time. However, the output of gate 101 is connected to an inhibit terminal on the gate 98. Thus, the gate 98 cannot conduct. Actually, this inhibit function is cited only because it is exemplary of a data processing type of analysis. Those skilled in the art will readily perceive many other ways in which a data processing circuit may analyze the digital signals.

The concept of the area of acceptance will become more apparent from a study of FIG. 4. The geophones 62, 63 are located a half-wave length apart on a "geophone center line" 110. A second "perpendicular bisection" line 111 may be drawing perpendicular to line 110 midway between the geophones. The area of acceptance is symmetrical around these two lines. The distance which the area extends outwardly from the geophone center line 110 is fixed by the gain of the amplifiers in the data processing channel. The distance which the area extends outwardly from the perpendicular bisector line 111 depends upon the duration of the acceptance aperture.

The relationship between the area of acceptance and the acceptance aperture is best explained mathematically, as follows.

Let:

$a$=the acceptance aperture, measured on a time scale
$v$=the seismic velocity
$s$=the maximum linear displacement here called the "acceptance window"

Then:

$$s = av \qquad (1)$$

This is merely another way of saying that the acceptance window is any point on the surface of the earth which is close enough to both geophones so that a seismic disturbance traveling across the acceptor window area will cause signals to be generated by the two geophones which will reach the AND gate 98 during a period of time (100, FIG. 3, VI) while a coincidence is possible.

If the linear distance between the geophones, $Y_A - Y_B$, is substituted for $s$ in Equation 1 the following ratio obtained:

$$\frac{Y_A - Y_B}{av}$$

Then this ratio may be set equal to some numerical value reflecting the user's needs. For example, FIG. 4 has been drawn to show the relative effects of ratios equal to 0.5 and 1.67. As the ratio is made smaller, the area of acceptance becomes smaller.

Hence, it is seen that the size and shape of the area of acceptance may be changed by varying the gain and the duration of the acceptance aperture. Moreover, by known data processing techniques, the digital signals may be analyzed to detect the probable source of the earth motion.

Accordingly, it should be understood that the invention has a broad general significance going beyond the specific equipment described above. Thus, the appended claims should be construed to cover all reasonable equivalents falling within the true spirit and scope of the invention.

The invention which is claimed is:

1. An intrusion directional seismic sensing system comprising means including a combination of geophones arranged in phased pairs, each of said geophones producing signals responsive to seismic disturbances, said signals occurring at instants in time which are related to each other as a function of the distance between the geophones and the seismic velocity of said disturbances, channel means individually associated with each of said geophones for processing the signals produced by the geophones responsive to said seismic disturbances, output means responsive to said signals occurring in adjacent ones of said channels within a predetermined period of time for indicating a detected disturbance, means for selectively varying the size and shape of the land area in which the output means can give said indication of said seismic disturbances, and means whereby said size and shape are varied by selectively adjusting the duration of said time period and the gain of said channel.

2. A seismic detector system comprising a plurality of geophones placed in phased pairs along a base line around the perimeter of a guarded area, the geophones of each of said phased pairs being spaced from each other by a half-wave length of a predetermined characteristic of earth motion as produced by a monitored source, each of said geophones being coupled to drive an individually associated channel, each of said channels comprising a cascade of a low gain amplifier, a base line clipper, a high gain amplifier, a Schmidt trigger, and a differentiator, said differentiator including means for limiting the duration of signals fed into said channels by the associated geophone, and logic gate means operated responsive to said limited signals for giving an output signal when said signals coincide in adjacent channels within the time period established by the duration of said signals.

References Cited

UNITED STATES PATENTS

| | | | |
|---|---|---|---|
| 2,972,733 | 2/1961 | Bucy | 340—15.5 |
| 3,063,034 | 11/1962 | Lee | 340—15.5 |
| 3,109,165 | 10/1963 | Bagno | 340—258 |
| 3,261,009 | 7/1966 | Stetten et al. | 340—261 |
| 3,386,076 | 5/1968 | Reynolds | 340—15.5 |
| Re. 25,902 | 11/1965 | Lee | 181—0.5 |

OTHER REFERENCES

Cooper, J. Acous. Soc. Amer., vol. 36, No. 7, July 1964, pp. 1378–1382.

RICHARD A. FARLEY, Primary Examiner